J. J. PETERS.
CULTIVATOR.
APPLICATION FILED JULY 6, 1914.
1,199,919.
Patented Oct. 3, 1916.
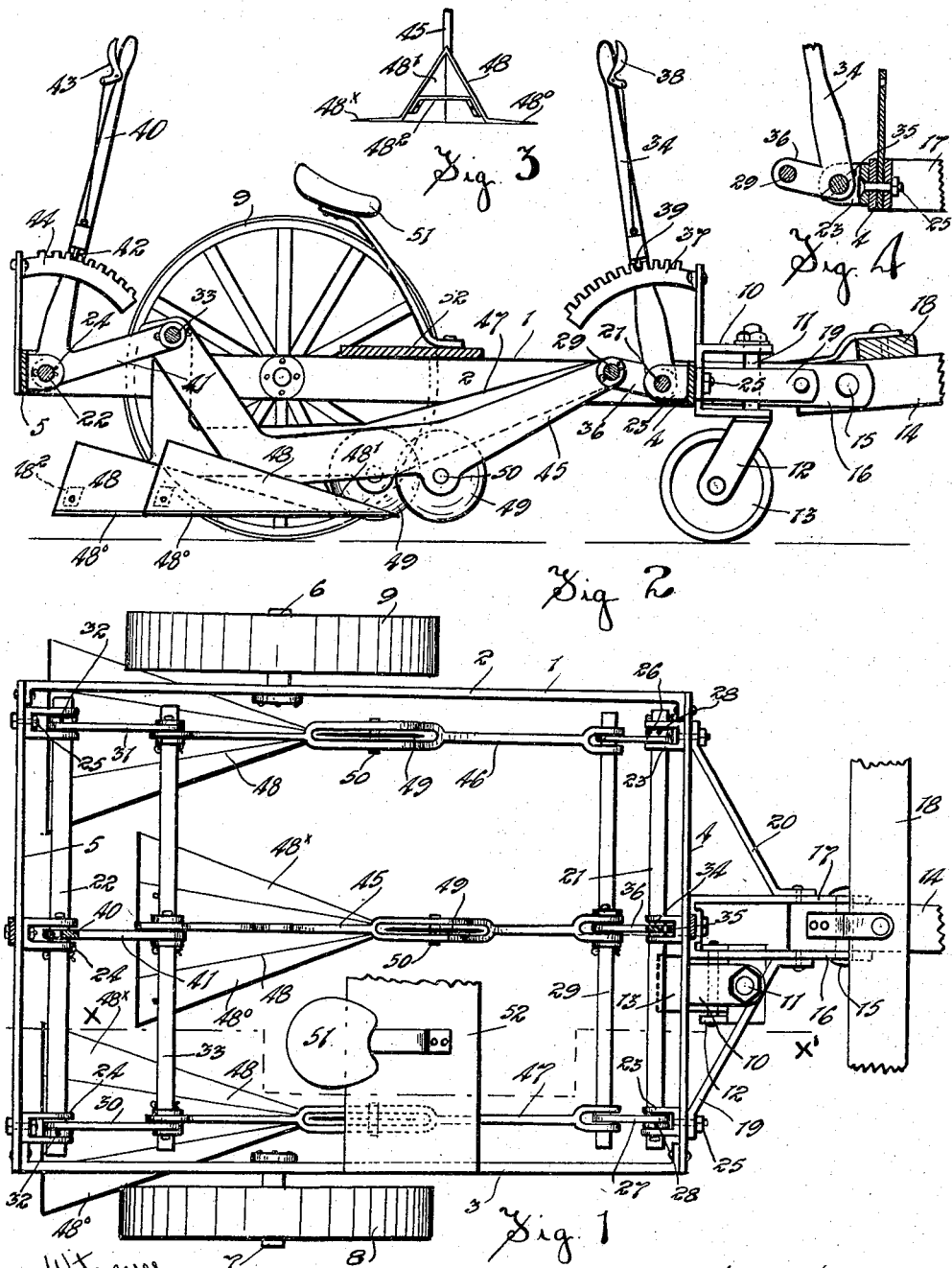

UNITED STATES PATENT OFFICE.

JOHANN J. PETERS, OF REINFELD, SASKATCHEWAN, CANADA.

CULTIVATOR.

1,199,919.  Specification of Letters Patent.  Patented Oct. 3, 1916.

Application filed July 6, 1914. Serial No. 849,124.

*To all whom it may concern:*

Be it known that I, JOHANN J. PETERS, of the village of Reinfeld, in the Province of Saskatchewan, Canada, have invented certain new and useful Improvements in Cultivators, of which the following is the specification.

The invention relates to improvements in cultivators and the object of the invention is to provide a cultivating machine which will effectively cultivate the ground, a particular feature of the invention residing in the provision of specially constructed cultivator blades suspended so that they can be adjusted in respect to the ground and in the provision of colters associated with the blades and adjusted with the same.

With the above objects in view the invention consists essentially in the arrangement and construction of parts hereinafter more particularly described and later pointed out in the appended claims, reference being had to the accompanying drawing in which:

Figure 1 represents a plan view of the complete machine. Fig. 2 represents a longitudinal sectional view through the same, the section being taken in the plane denoted by the line X—X' Fig. 1, with parts broken away. Fig. 3 represents a rear view of one of the cultivator blades. Fig. 4 represents an enlarged detailed sectional view through one of the brackets showing the connection of the lever 34 to the adjusting shaft.

In the drawing like characters of reference indicate corresponding parts in each figure.

1 represents a substantially rectangular frame formed from suitable connected side members 2 and 3 and front and rear end members 4 and 5.

6 and 7 represent stub shafts permanently fastened to the sides of the frame and provided with traction wheels 8 and 9.

10 represents a bracket permanently secured forwardly to the frame and carrying a pivoted spindle 11 fitted with forks 12 in which I have mounted a caster or pivot wheel 13.

14 represents a draft tongue pivotally connected by a pivot bolt 15 to draft bars 16 and 17 extending from the frame.

18 is a double tree pivotally secured to the rear end of the tongue.

19 and 20 are angularly disposed brace bars interposed between the draft bars and the frame.

21 and 22 represent similar front and rear adjusting shafts rotatably mounted in front and rear sets of brackets 23 and 24 permanently fastened by bolts 25 to the front and rear members of the frame.

26 and 27 are a pair of hangers extending rearwardly from the shaft 21 and permanently fastened to the same by pins 28. The rear ends of the hangers carry a front cross shaft 29.

30 and 31 are a further pair of hangers extending forwardly from the shaft 22 and permanently fastened to the same by pins 32. These latter hangers carry a rear cross shaft 33.

34 is a front lever permanently fastened to the adjusting shaft 21 by means of a pin 35. The lower end of the lever is supplied with a rearwardly extending arm 36 having the rear end mounted on the shaft 29.

37 is a quadrant carried by the frame and associated with the lever. The lever is supplied with the usual hand latch 38 and detent 39, the detent operating over the quadrant.

40 is a second lever supplied with a forwardly extending arm 41 having the front end thereof mounted on the cross shaft 33.

42 is a detent and 43 a hand latch carried by the lever, the detent operating over a quadrant 44 connected to the rear cross member of the frame.

45 is a central and 46 and 47 are side cultivator beams, which beams have their front and rear ends swung from the shafts 29 and 33.

A cultivator blade 48 is secured permanently to each beam and the beams are bent in a peculiar manner in order to stagger the blades across the machine.

Each blade is formed from a metallic plate having a tapering body portion 48' of a V-shaped cross section which terminates in a point and carries at the sides horizontally disposed V-shaped wings 48° and 48ˣ having their edges sharpened.

A brace 48² is inserted to reinforce the body piece.

49 are flat disks or colters rotatably mounted on spindles 50 carried by the beams, it being noticed that the beams are spread in advance of the cultivator blades to admit the colters. It is pointed out also that there is a colter directly in advance of each cultivator blade and that the colter is arranged to cut at all times deeper than the point of the blade.

51 is a seat mounted on a suitable cross board 52 carried by the frame.

When the machine is used and drawn over the ground by the usual draft animals hitched to the double tree, the driver or attendant can manipulate the levers to adjust the cultivator blades to effect shallow or deep cultivation, the levers also controlling the pitch of the blades.

It will be seen that if both levers be swung inwardly approximately a like amount the front and rear ends of the beams will be dropped evenly with the result that the depth of cut only is effected. On the other hand if one lever only is adjusted the beams are tilted in respect to the ground with the result that the angle of the cultivators to the ground is changed.

With the machine as described effective cultivating can be done under the varying conditions met with in the field owing to the manner in which the cultivating blades can be adjusted to meet requirements.

What I claim as my invention is:—

In a cultivator the combination with a main frame mounted on suitably supported wheels, of front and rear rotatably mounted adjusting shafts passing transversely across the frame, a pair of rearwardly extending hangers having their forward ends permanently secured to the front shaft, a pair of forwardly extending hangers having their rear ends permanently secured to the rear shaft, front and rear cross shafts carried by the hangers and contained within the frame, front and rear adjusting levers permanently secured to the front and rear adjusting shafts and provided each, adjacent the said adjusting shafts, with inwardly extending arms having their innermost ends mounted respectively on the cross shafts, quadrants carried by the frame and associated with the levers, a plurality of substantially L-shaped, longitudinally extending cultivator beams disposed within the frame and having their front and rear ends swung from the cross shafts and cultivator blades permanently secured to the lowermost portions of the beams.

Signed at Hague this 2nd day of June, 1914.

JOHANN J. PETERS.

In the presence of—
C. P. UNRUH,
LOUISE UNRUH.

Copies of this patent may be obtained for five cents each, by addressing the "Commissioner of Patents, Washington, D. C."